UNITED STATES PATENT OFFICE.

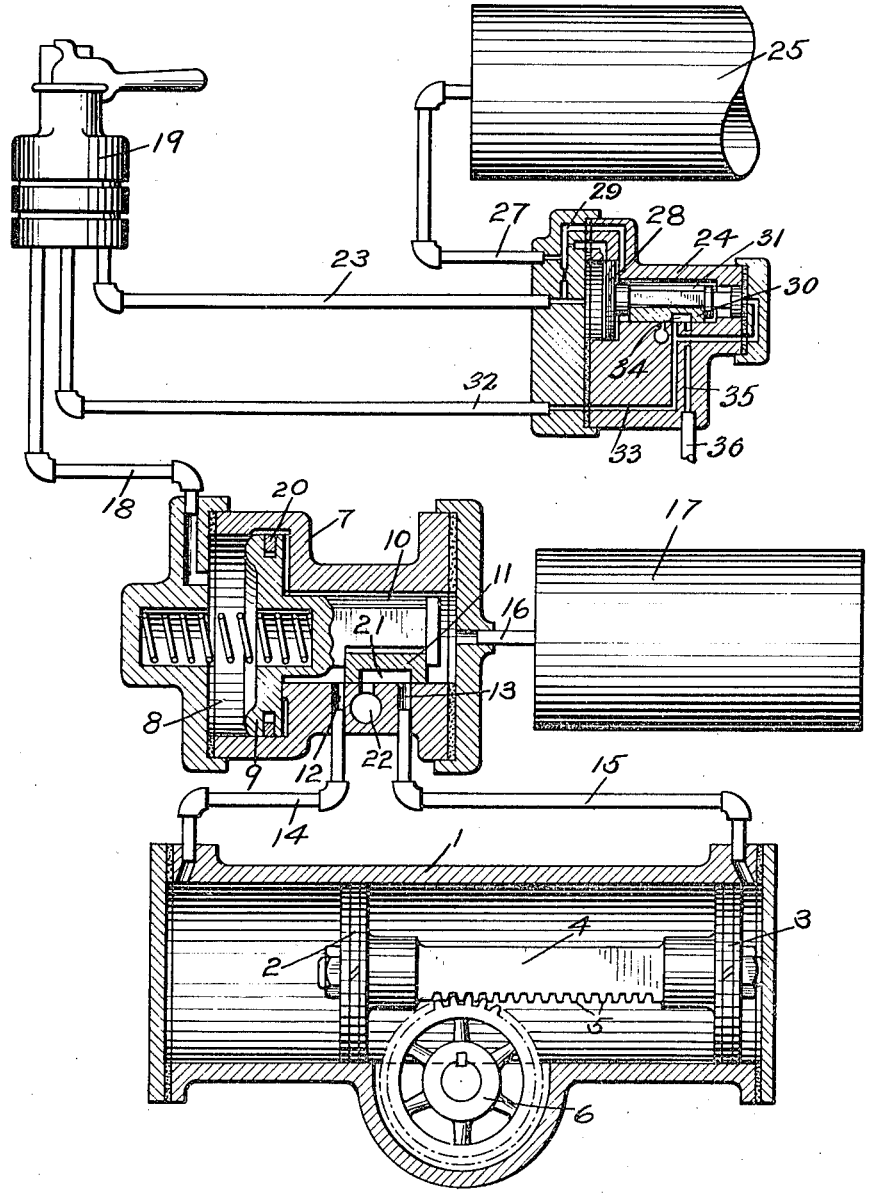

WILLIAM M. CADY, OF EDGEWOOD PARK, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR-DOOR-OPERATING MECHANISM.

1,292,430.  Specification of Letters Patent.  Patented Jan. 28, 1919.

Application filed April 14, 1916. Serial No. 91,210.

*To all whom it may concern:*

Be it known that I, WILLIAM M. CADY, a citizen of the United States, residing in Edgewood Park, county of Allegheny, and State of Pennsylvania, have invented a certain new and useful Improvement in Car-Door-Operating Mechanism, of which the following is a specification.

This invention relates to fluid operated door and step controlling devices, particularly as applied for controlling doors and steps of cars used in electric traction service and the like.

The principal object of my invention is to provide a valve device operated by varying the fluid pressure in a pipe normally containing fluid under pressure for controlling the door operating motor.

In the accompanying drawing, the single figure is a diagrammatic view of a car equipment embodying my invention.

The door and step controlling motor may comprise a cylinder 1 containing a double headed piston device having piston heads 2 and 3 and a connecting stem 4 provided with rack teeth 5 adapted to mesh with the teeth of a pinion 5, the rotation of which effects the opening and closing of the car doors and steps through suitable mechanism which it is not deemed necessary to illustrate, since the same is not essential to a clear understanding of the invention.

According to my invention, a valve device is provided for controlling the admission and release of fluid under pressure to and from the piston heads 2 and 3, which may comprise a casing 7 having a piston chamber 8 containing a piston 9 and a valve chamber 10 containing a slide valve 11 for controlling ports 12 and 13 leading to pipes 14 and 15 which are connected to the respective chambers at the outer faces of piston heads 2 and 3.

The valve chamber 10 is connected by pipe 16 to a reservoir 17 and piston chamber 8 is connected by pipe 18 to a manually operated valve such as brake valve 19, of the general character of that shown in Patent No. 1,145,045, of Walter V. Turner, dated July 6, 1915.

In operation, when the brake valve 19 is in a position for effecting the closing of the car doors and steps, port connections are made for supplying fluid under pressure through pipe 18 to piston chamber 8, so that piston 9 is shifted to the position shown in the drawing, in which a feed groove 20 is opened around piston 9, permitting fluid under pressure to equalize on opposite sides of the piston and charging the reservoir 17.

In this position of piston 9, the slide valve 11 uncovers port 12, so that fluid under pressure is supplied from valve chamber 10 to piston head 2, while a cavity 21 in the slide valve connects port 13 with an exhaust port 22, so that fluid is vented from piston head 3, thus permitting the fluid pressure acting on piston head 2 to shift the piston device to the position shown in the drawings, thereby effecting the closing of the car doors and steps.

If it is desired to open the car doors and steps, the brake valve 19 is turned to a position for venting fluid from pipe 18, and since the pressure in piston chamber 8 is reduced, the piston 9 will be shifted outwardly by the fluid pressure in valve chamber 10, causing the slide valve 11 to uncover port 13 for supplying fluid from valve chamber 10 to piston head 3, and at the same time, the port 12 is connected by cavity 21 to exhaust port 22, so that fluid is vented from piston head 2 and the piston device is shifted to the left, so as to effect the opening of the car doors and steps.

It has heretofore been proposed to provide an emergency valve device which is adapted upon a reduction in pressure in an emergency brake pipe to effect an emergency application of the brakes.

The emergency valve device 24 may be similar to that shown in prior Patent No. 1,145,045, of Walter V. Turner, dated July 6, 1915, in which a source of fluid pressure, such as the main reservoir 25, is connected by a pipe 27 and passage 29 to opposite sides of the emergency piston 28, so that fluid is supplied from the emergency valve device to the emergency brake pipe 23 and the emergency brake pipe serves as the source of fluid pressure for the brake valve 19.

The emergency piston 28 operates a slide valve 30, contained in valve chamber 31, for controlling the admission and release of fluid to and from a brake cylinder. A straight air pipe 32 is connected to passage 33 and in the release position of the parts, said passage is connected by cavity 34 with passage 35 leading to brake cylinder pipe 36.

The brakes are controlled by straight air upon manipulation of the brake valve 19 so as to supply and release fluid to and from the pipe 32 and an emergency application of the brakes is effected by reducing the pressure in the emergency brake pipe 23, so that piston 28 is operated to move valve 30 and permit the supply of fluid from valve chamber 31 and reservoir 25 to the brake cylinder.

It will therefore be noted that while the brake valve is normally in a position for supplying fluid to pipe 18 and piston chamber 8, when fluid is vented from the emergency brake pipe, fluid pressure will also be vented from piston chamber 8, so as to cause the outward movement of piston 9 and slide valve 11 and the consequent operation of the double headed piston device to effect the opening of the car doors and steps.

Having now described my invention, what I claim as new and desire to secure by Letters Patent, is:

The combination with a source of fluid under pressure, an emergency brake pipe, a reduction in pressure in which is adapted to effect an application of the brakes, of a door controlling motor device, a valve device for varying the pressure on said motor device, a pipe for varying the pressure on said valve device, and a manually operated valve normally supplying fluid from said emergency brake pipe to said door controlling pipe.

In testimony whereof I have hereunto set my hand.

WILLIAM M. CADY.